US012795044B2

(12) United States Patent
Siu

(10) Patent No.: US 12,795,044 B2
(45) Date of Patent: *Nov. 10, 2026

(54) TECHNIQUES FOR CAPTURING VIDEO IN LANDSCAPE MODE BY A HANDHELD DEVICE

(71) Applicant: Donald Siu, Santa Ana, CA (US)

(72) Inventor: Donald Siu, Santa Ana, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 19/078,010

(22) Filed: Mar. 12, 2025

(65) Prior Publication Data

US 2025/0211707 A1 Jun. 26, 2025

Related U.S. Application Data

(63) Continuation of application No. 18/656,387, filed on May 6, 2024, now Pat. No. 12,256,159, which is a (Continued)

(51) Int. Cl.
*H04N 5/91* (2006.01)
*H04N 5/265* (2006.01)
(Continued)

(52) U.S. Cl.
CPC ............... *H04N 5/91* (2013.01); *H04N 5/265* (2013.01); *H04N 23/62* (2023.01); (Continued)

(58) Field of Classification Search
CPC .......... H04N 5/91; H04N 5/265; H04N 23/62; H04N 23/667; H04N 23/80; H04N 23/90; (Continued)

(56) References Cited

U.S. PATENT DOCUMENTS 6,831,659 B1 12/2004 Mukoyama et al.
7,796,155 B1 * 9/2010 Neely, III .............. G06V 20/52 348/157
(Continued)

FOREIGN PATENT DOCUMENTS

| | | | |
|---|---|---|---|
| CN | 110365896 | A | 10/2019 |
| WO | 2019076373 | A1 | 4/2019 |
| WO | 2022109332 | A1 | 5/2022 |

OTHER PUBLICATIONS

First Office Action from Chinese Patent Application No. 202180088900.4, dated Mar. 30, 2026 with English machine translation, 26 pages.
(Continued)

*Primary Examiner* — Hung H Lam
(74) *Attorney, Agent, or Firm* — ASHURST PERKINS COIE US LLP

(57) ABSTRACT

Video or image capture device and method of operation of the capture device are described. One example method includes determining, for a video capture by a capture device, a capture orientation mode setting of the capture device, capturing a video using one of a first camera or a second camera based on the capture orientation mode and a current orientation of the capture device, wherein the video is in the capture orientation mode, and storing, after capturing, the video in a video file.

12 Claims, 9 Drawing Sheets

Related U.S. Application Data continuation of application No. 18/329,542, filed on Jun. 5, 2023, now Pat. No. 11,985,434, which is a continuation of application No. 17/654,111, filed on Mar. 9, 2022, now Pat. No. 11,689,819, which is a continuation of application No. 17/139,513, filed on Dec. 31, 2020, now Pat. No. 11,297,260.

(60) Provisional application No. 63/116,537, filed on Nov. 20, 2020.

(51) Int. Cl.

| | |
|---|---|
| ***H04N 23/62*** | (2023.01) |
| ***H04N 23/667*** | (2023.01) |
| ***H04N 23/80*** | (2023.01) |
| ***H04N 23/90*** | (2023.01) |
| ***H04N 23/951*** | (2023.01) |
| ***H04N 23/957*** | (2023.01) |

(52) U.S. Cl.
CPC ........... *H04N 23/667* (2023.01); *H04N 23/80* (2023.01); *H04N 23/90* (2023.01); *H04N 23/951* (2023.01); *H04N 23/957* (2023.01)

(58) Field of Classification Search
CPC .... H04N 23/951; H04N 23/957; H04N 23/45; H04N 23/63; H04N 23/631; H04N 23/6812; H04N 9/8205; H04N 5/772; H04N 5/9201; H04N 23/57; G06F 1/1686; H04M 1/0264
See application file for complete search history.

(56) References Cited

U.S. PATENT DOCUMENTS

| | | | | |
|---|---|---|---|---|
| 7,907,838 | B2 | 3/2011 | Nasiri et al. | |
| 9,983,628 | B2 | 5/2018 | Kim et al. | |
| 10,531,751 | B2 | 1/2020 | Mu | |
| 10,764,511 | B1* | 9/2020 | Peterson | H04N 5/2628 |
| 11,297,260 | B1 | 4/2022 | Siu | |
| 11,409,434 | B2 | 8/2022 | Yang et al. | |
| 11,689,819 | B2 | 6/2023 | Siu | |
| 11,985,434 | B2 | 5/2024 | Siu | |
| 12,256,159 | B2 | 3/2025 | Siu | |
| 2006/0006316 | A1 | 1/2006 | Takenaka | |
| 2007/0223887 | A1 | 9/2007 | Kanamori et al. | |
| 2009/0262074 | A1 | 10/2009 | Nasiri et al. | |
| 2010/0151913 | A1* | 6/2010 | Park | G06F 3/038 455/566 |
| 2012/0162263 | A1 | 6/2012 | Griffin et al. | |
| 2013/0147923 | A1* | 6/2013 | Zhou | H04N 13/296 348/46 |
| 2013/0258122 | A1* | 10/2013 | Keane | H04N 23/6812 348/208.4 |
| 2014/0098197 | A1 | 4/2014 | Geris et al. | |
| 2014/0240543 | A1 | 8/2014 | Kim et al. | |
| 2014/0320715 | A1* | 10/2014 | Haji-Khamneh | H04N 23/80 348/302 |
| 2015/0287194 | A1 | 10/2015 | Schoenmeyer et al. | |
| 2015/0341536 | A1 | 11/2015 | Huang et al. | |
| 2015/0350505 | A1 | 12/2015 | Malkin et al. | |
| 2016/0365114 | A1 | 12/2016 | Galant et al. | |
| 2016/0365124 | A1 | 12/2016 | Galant et al. | |
| 2017/0004770 | A1* | 1/2017 | Jin | H04N 13/341 |
| 2017/0064247 | A1 | 3/2017 | Schwartz et al. | |
| 2017/0111575 | A1 | 4/2017 | Zhang et al. | |
| 2017/0256288 | A1 | 9/2017 | Ai et al. | |
| 2018/0124315 | A1 | 5/2018 | Fink et al. | |
| 2019/0104324 | A1 | 4/2019 | Han et al. | |
| 2019/0313023 | A1 | 10/2019 | Stewart | |
| 2020/0193677 | A1* | 6/2020 | Vaganov | A63F 13/65 |
| 2020/0409549 | A1 | 12/2020 | Yang et al. | |
| 2021/0041700 | A1 | 2/2021 | Sheraj et al. | |
| 2021/0185223 | A1 | 6/2021 | Hempel | |
| 2021/0314467 | A1 | 10/2021 | Kramer et al. | |
| 2022/0201224 | A1 | 6/2022 | Siu | |
| 2023/0017668 | A1 | 1/2023 | Choi et al. | |
| 2023/0319427 | A1 | 10/2023 | Siu | |
| 2024/0292118 | A1 | 8/2024 | Siu | |

OTHER PUBLICATIONS

Extended European Search Report received in European Patent Application No. 21895713.2 dated Sep. 13, 2024; 36 pages.
International Search Report and Written Opinion for International Patent Application No. PCT/US2021/060190 mailed Feb. 8, 2022.

* cited by examiner

TECHNIQUES FOR CAPTURING VIDEO IN LANDSCAPE MODE BY A HANDHELD DEVICE

CROSS-REFERENCE TO RELATED APPLICATIONS

The present application is a continuation of and claims the benefit of U.S. patent application Ser. No. 18/656,387, filed May 6, 2024, which is a further continuation of and claims the benefit of U.S. patent application Ser. No. 18/329,542, filed Jun. 5, 2023, now U.S. Pat. No. 11,985,434, issued May 14, 2024, which is a further continuation of and claims the benefit of U.S. patent application Ser. No. 17/654,111, filed Mar. 9, 2022, now U.S. Pat. No. 11,689,819, issued Jun. 27, 2023, which is a further continuation of and claims the benefit of U.S. patent application Ser. No. 17/139,513, filed Dec. 31, 2020, now U.S. Pat. No. 11,297,260, issued Apr. 5, 2022, which further claims the benefit of priority to Provisional Patent Application No. 63/116,537, filed Nov. 20, 2020, the disclosures of which are incorporated herein by reference in their entirety.

TECHNICAL FIELD

The present document relates to image and video capture technologies using a handheld electronic device with a camera.

BACKGROUND

Nowadays, most handheld computing devices come equipped with a camera. Users use these devices for capturing video and images.

SUMMARY

This document discloses techniques for enforcing landscape mode for video and image captures by a handheld device irrespective of the orientation of the handheld device during the capture.

In one example aspect, a method of camera operation is disclosed. The method includes determining, for a video capture by a capture device, a capture orientation mode setting of the capture device, capturing a video using one of a first camera or a second camera based on the capture orientation mode and a current orientation of the capture device, wherein the video is in the capture orientation mode, and storing, after capturing, the video in a video file.

In yet another example aspect, a video capture device is disclosed. The video capture device includes a first camera configured to capture a landscape mode video, a second camera configured to capture a portrait mode video, an orientation sensor configured to detect a current orientation of the video capture device, a user interface, and a processor configured to receive a capture orientation mode setting, control a video capture session using one of a first camera or a second camera based on the capture orientation mode and the current orientation of the capture device, and store the video into a memory associated with the video capture device.

In another example aspect, a video capture device that includes a processor is disclosed. The apparatus is configured to implement one of the methods described herein.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 3 shows an example of an image capture mode.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. Furthermore, throughout this document, the term video is used for compactness, and it will be understood that the described techniques are applicable to capture and storage of both video (a sequence of pictures) or a single picture or image. Furthermore, for ease of description, the term "phone" "mobile phone" or "cellphone" is used to describe a variety of different handheld devices that include a camera. Such devices include handheld tablets, pads, laptops, electronic book readers, and so on.

Most handheld electronic devices are oblong shaped-meaning that they are longer in one dimension compared to the other dimension. For example, most mobile phones and tablets are rectangular. When a user holds such a device with the longer dimension in vertical direction, this orientation of the device is called "portrait mode." Similarly, when a user holds a device with the longer dimension in horizontal orientation, this is sometimes called "landscape mode" operation of the device.

Figure 5:
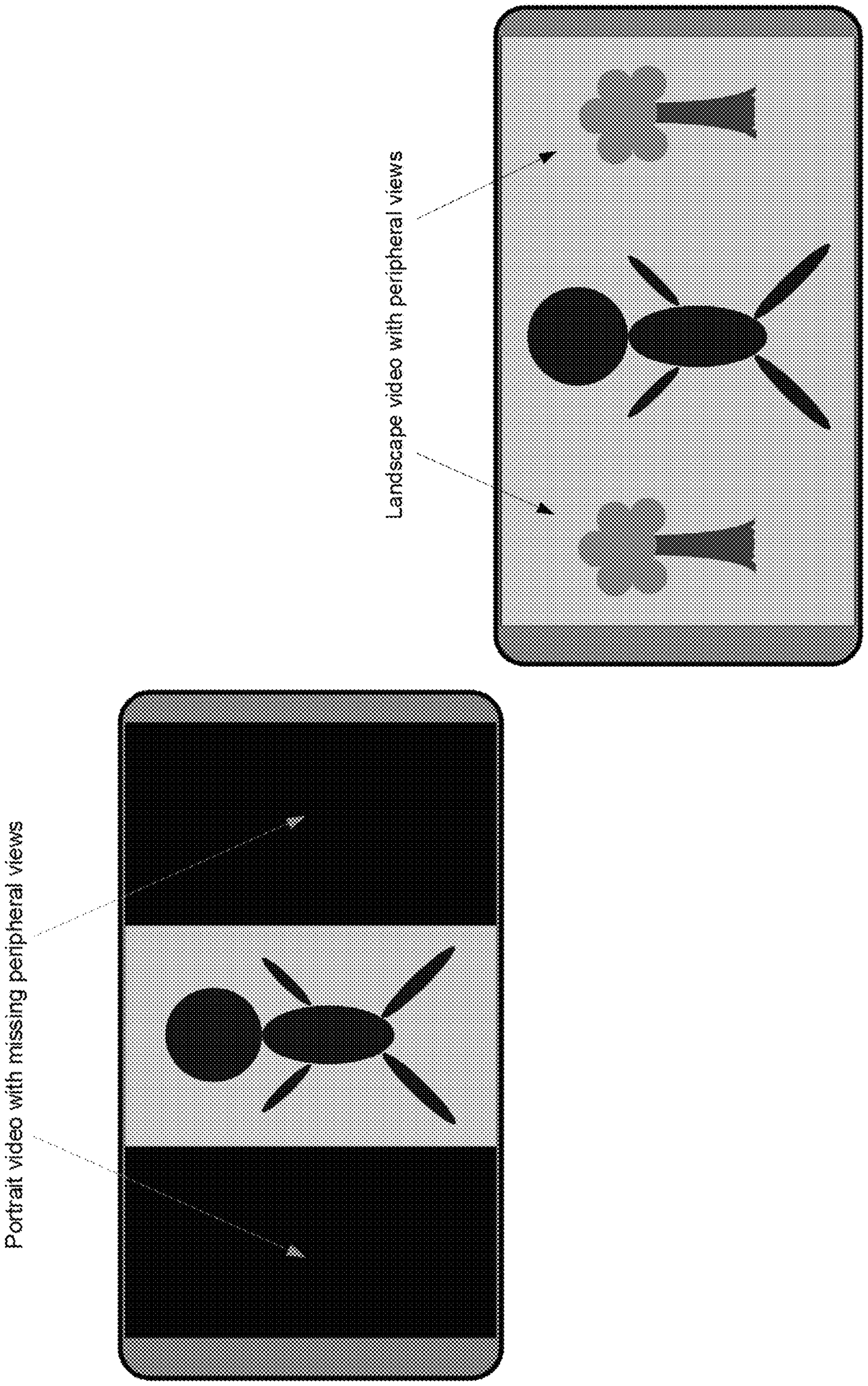
FIG. 5 shows an example of a captured landscape mode video on a landscape mode screen.

Users typically hold cellphones in portrait mode for making phone call, texting and capturing videos. While portrait mode is convenient for grasping, when video is captured in portrait mode, more than 50% of the actions in view are not captured (Ref. FIG. 5 & FIG. 6). Only center of the viewing area is shown or captured in the portrait video. What missing are the wider angle peripheral actions that can add more details to the event, whether it is for entertainment, special occasion, eyewitness account of an incident, or eyewitness account of a crime in progress.

Holding the cellphone in portrait mode provides at least the following advantages. First, it improves productivity by enabling one hand operation, using the thumb as keystroke input in navigating, making phone call, texting and photo/video capturing. Second, it provides a higher vantage point when holding the cellphone up for photo/video capturing. Third, it has less chance of having the camera obscured by the user's finger. In one advantageous aspect, the techniques disclosed in the present document facilitate wide angle video capture for the popular way of holding the cellphone, and allows for the capturing video in landscape mode.

Figure 1:
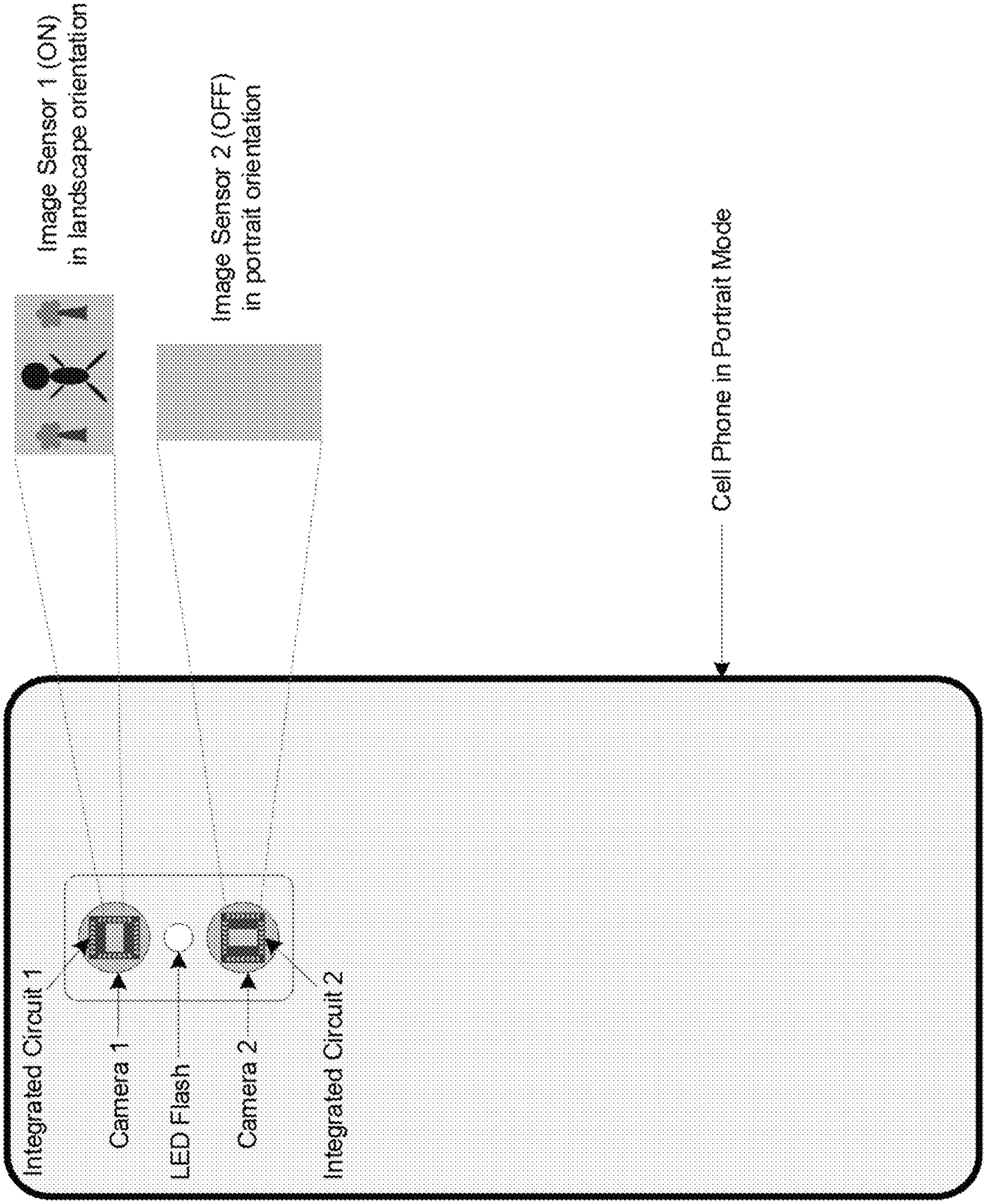
FIG. 1 shows an example of a handheld device in portrait mode.

FIG. 1 shows an example of a mobile phone in portrait mode orientation. This phone is equipped with 2 cameras that include the lens portion. The phone further includes a flash for providing lighting during video capture. This flash may be, for example, a light emitting diode (LED).

Figure 3:
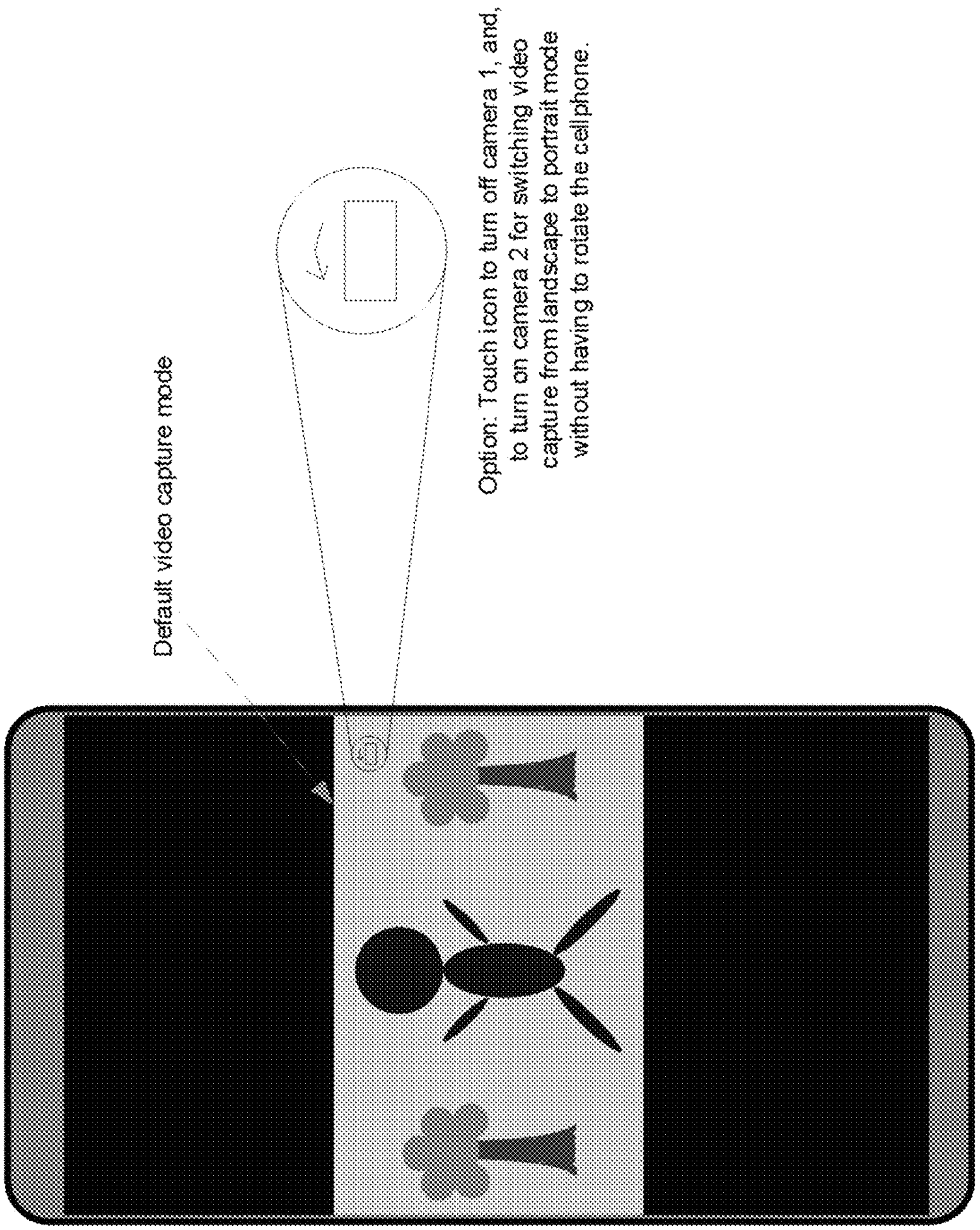
FIG. 3 shows an example of a default video capture mode.

The two forward facing cameras of the cellphone will typically have same pixel resolution for image capture. Further, the two cameras typically are designed to capture images with the same aspect ratio. The phone may be equipped with image sensor 1 in landscape orientation and image sensor 2 in portrait orientation (Ref. FIG. 1 & FIG. 3).

FIG. 1 shows an example of a cellphone in portrait mode. Two camera capturing lenses, an LED flash and two integrated circuits for capturing and storing images are shown. In some embodiments, only one image sensor may be active during capture, depending on the orientation of the cellphone. For example, image sensor 1 may be turned on for landscape orientation captures and image sensor 2 may be turned on for portrait mode captures.

Figure 2:
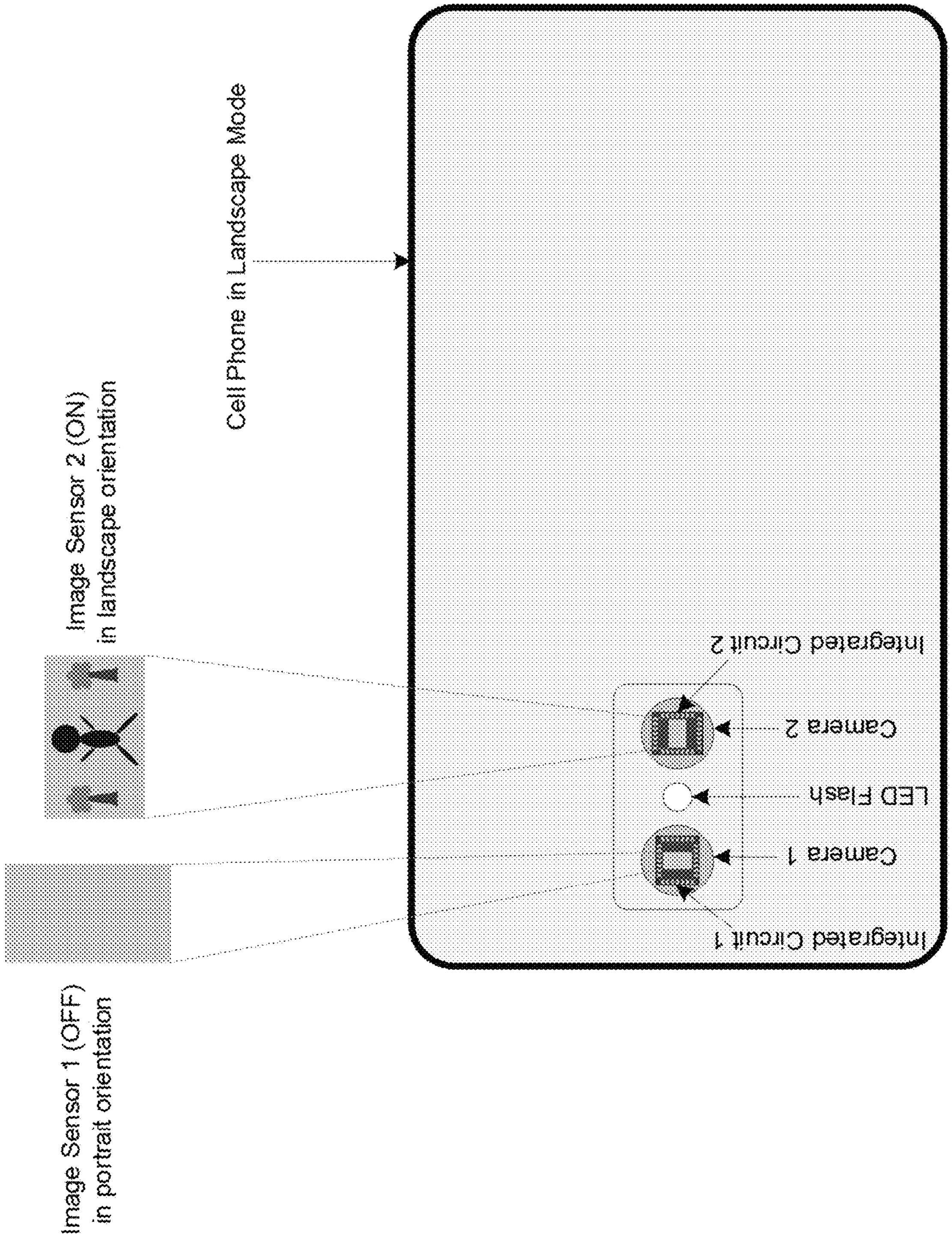
FIG. 2 shows an example of a handheld device in landscape mode.

FIG. 2 shows the operation of cellphone of FIG. 1 in a landscape mode. Here, image sensor 2 is on and image sensor 1 is turned off.

When the cellphone is held in portrait mode, and the video capture function is turned on, the cellphone accelerometer or screen orientation sensor (not explicitly shown in the drawings) is enabled to turn on camera 1, leaving camera 2 off. The resulting captured video is in landscape mode. In some embodiments, the cellphone accelerometer or the screen orientation sensor may be advantageously implemented on a long edge of the cellphone for improving accuracy of orientation. In some embodiments, two (or more) physically separate the cellphone accelerometer or the screen orientation sensor components may be used, one placed along the long edge and the other placed along the short edge of cellphone and signal from these multiple sensors may be averaged or linearly weighted to get a precise measurement of cellphone orientation.

While camera 1 recording is in progress, if the user rotates the cellphone to landscape mode, upon detecting the mode change, the cellphone turns off camera 1, and turns on camera 2. The transition from recording using camera 1 to camera 2 may be advantageously synchronized with the speed of rotation and the frames-per-second capture speed of the camera. In some embodiments, a memory window may be used to account for frequency rotation of cellphone. For example, if the cellphone rotates between landscape mode and portrait mode and rotates back to the original mode within a specified time window (e.g., 1 second), such a rotation may be ignored and no change in the recording mode may be performed due to such transient rotations.

At the end of the video capturing session, the cellphone produces 2 landscape video clips, one from camera 1 and the other from camera 2. The cellphone can now join these 2 video clips of the same resolution and aspect ratio, to create one complete and seamless landscape video file.

By default, the cellphone may boot up with video capture function enabled in landscape mode. The same default landscape mode can be applied to photo capture function. The user can change it to portrait mode for the session via onscreen icon selection, or change it in the camera setting as a default for portrait mode at boot up.

If the cellphone is held in portrait mode and is capturing video for the entire session. The resulting video clip, captured by camera 1, is in landscape mode and no further video processing for reorientation is required.

If the cellphone is held in landscape mode and is capturing video for the entire session. The resulting video clip, captured by camera 2, is in landscape mode, no further video processing for reorientation is required.

In some embodiments, Integrated Circuit 1 and Integrated Circuit 2 may be functionally identical. Both may have the same horizontal and vertical pixel resolution, and the same width to height aspect ratio. The orientation of the cellphone, portrait or landscape, may be determined by the cellphone's accelerometer. The upside of the image sensors may also be determined by the accelerometer. When multiple video clips are captured in a session with alternate mode change from portrait to landscape and vice versa, the video clips, captured by camera 1 and 2, may be joined in chronological order and with matching upside. The resulting combined video clip shows a complete video in landscape mode. As an example, without matching upside of the image sensors, the resulting combined video clip would show a right side up video is joined with an upside down video.

In some embodiments, integrated Circuit 1 may be mounted 90 degrees with respect to Integrated Circuit 2. As a result, Image Sensor 1 appears as rotating 90 degrees with respect to Image Sensor 2 (Ref. FIG. 1 & FIG. 2).

While holding the cellphone in portrait mode and aiming at the subject, the user can capture landscape photo or portrait photo by selecting the assigned onscreen icon without having to rotate the cellphone. The photo session involves selecting camera 1 for landscape or camera 2 for portrait respectively. Photo mode may depend on user's last use. If last use is landscape, the cellphone will come on as landscape. If last use is portrait, the cellphone will come on as portrait.

FIG. 3 shows an example of an icon presented on the user device during video capture. By interacting with this icon, the user can change capture orientation without having to physically change the orientation of the camera. For example, touching the icon during video capture may change the capture orientation without interrupting the capture. Alternatively or in addition, in some embodiments, the icon may have to be continuously touched to temporarily change the capture orientation and release the touch may put the capture orientation back in its original orientation.

Figure 4:
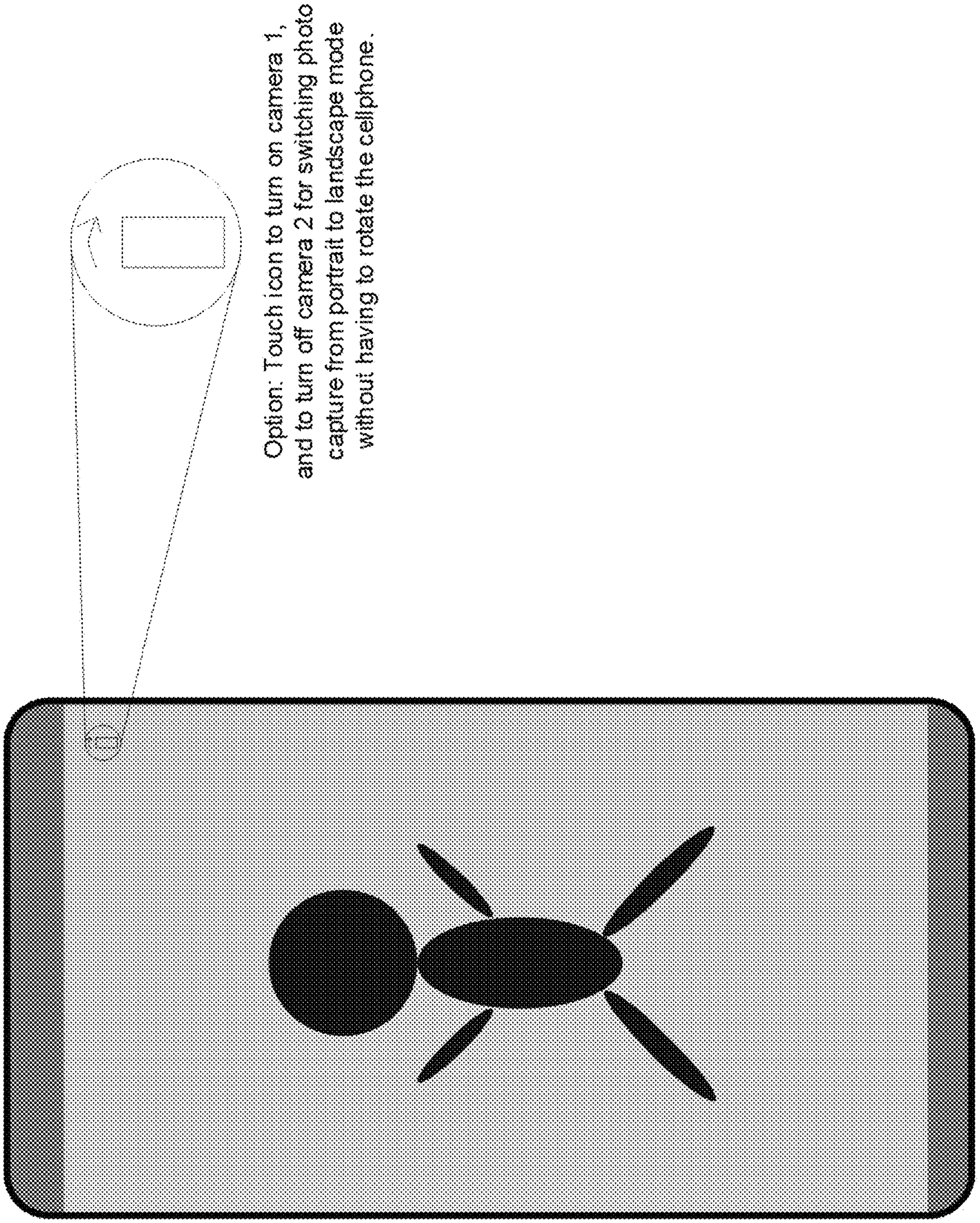
FIG. 4 shows an example of viewing a captured portrait mode video in a landscape mode screen.

FIG. 4 shows another example of the icon in the portrait mode of video capture. Here, video that is currently being captured in portrait mode, can be reoriented to landscape mode by selecting the icon.

FIG. 5 shows an example of limitations of portrait video being displayed in landscape mode (top left) due to which peripheral scene capture is missing from the view. By contrast, in landscape mode (bottom right), additional video scenery is being captured and displayed.

Figure 6A:
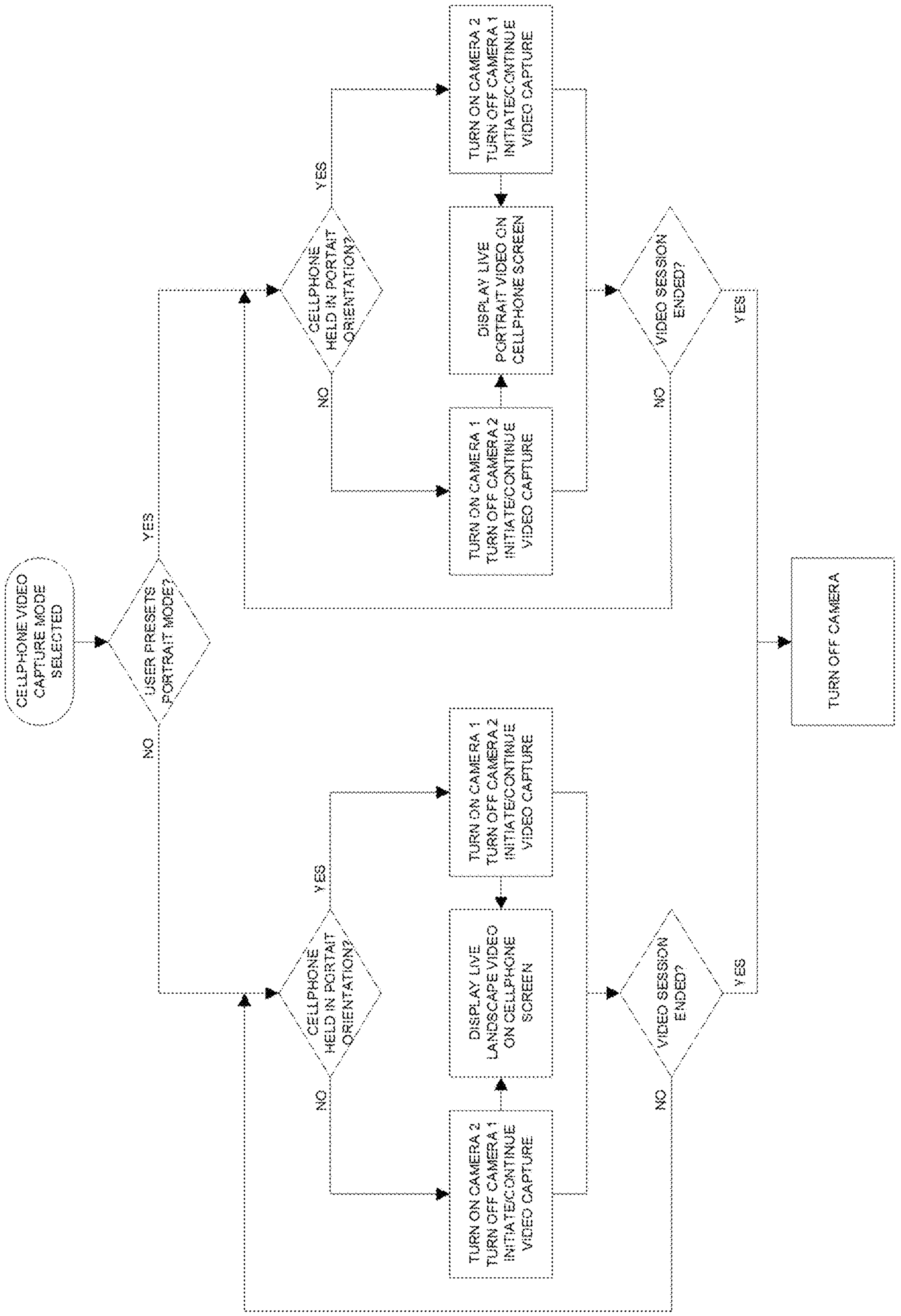
FIGS. 6A-6B show a flowchart of an example method of capturing a video or an image.
Figure 6B:
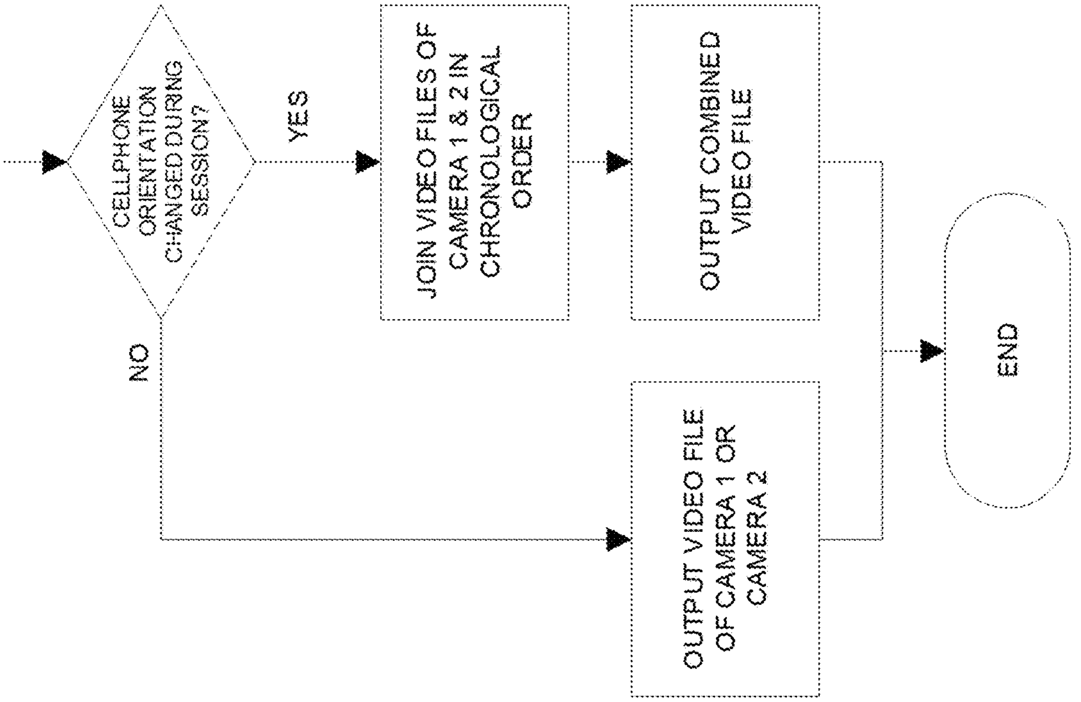

FIG. 6A-6B shows a flowchart form a method of operation of the camera. At start, a video capture mode may be selected for the cellphone. If the user has made a preset selection of portrait mode, a check is made about whether the cellphone is currently held in portrait mode. If yes, then camera 2 is turned on, camera 1 is turned off and video capture is initiated or continued. Otherwise, if no, then camera 1 is turned on and camera 2 is turned off, and video capture is initiated or continued. Both these operations further display the video.

During the operation of the video capture session, the check regarding whether cellphone is held in portrait mode is continuously performed.

If a determination is made that the portrait mode is not preset by the user, then a determination is made about whether the cellphone is currently in portrait mode. If yes, then camera 1 is turned on and camera 2 is turned off, and video capture is initiated or performed. If no, then camera 2 is turned on, camera 1 is turned off and video capture is initiated or performed. Upon determining that the video capture session has ended, the camera might be turned off. Otherwise, determination of portrait mode operation is continuously performed.

In the above description, camera 1 corresponds to landscape mode capture camera and camera 2 corresponds to portrait mode operation of the camera.

As shows in FIG. 6B, depending on whether cellphone orientation was changed during video capture session, a video editing may be performed to join video files from camera 1 and camera 2 in a chronological order to generate a seamless video file with same orientation throughout the video file. Otherwise, no editing needs to be performed and the capture video is stored in a memory of the capture device.

Figure 7:
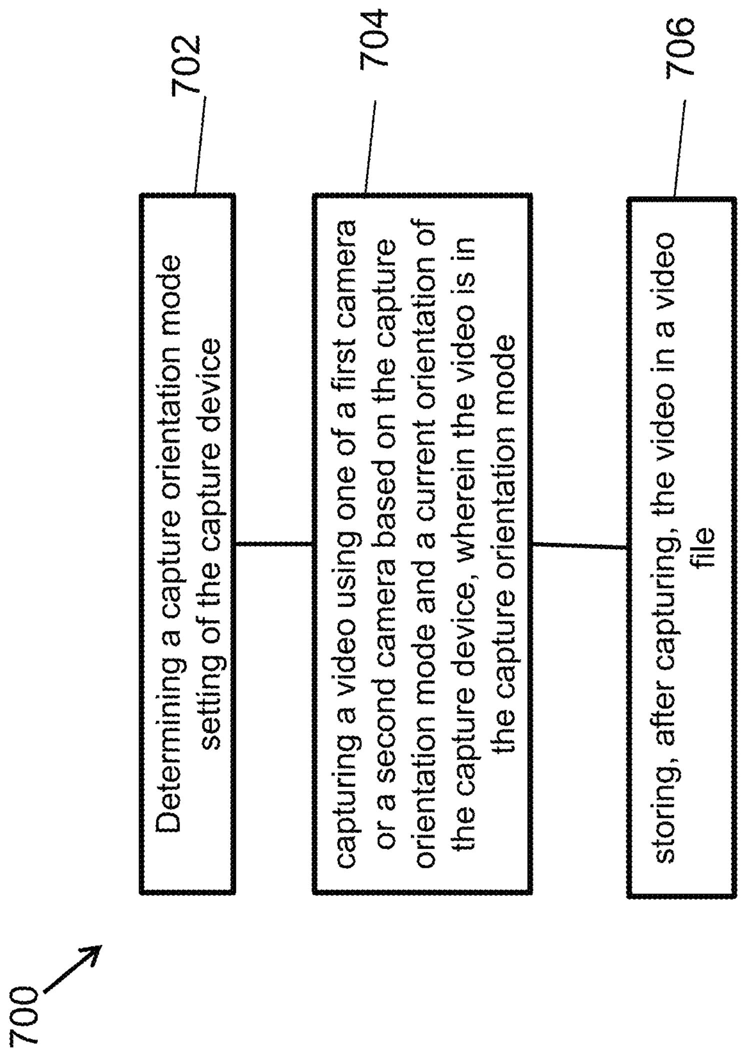
FIG. 7 shows a flowchart of an example method of operating a video capture device.

FIG. 7 shows an example method 700 of camera operation. The camera operation may be, for example, performed by an electronic device that includes camera 1 and camera 2 as described with respect to FIGS. 1 and 2.

The method 700 includes determining (702), for a video capture by a capture device, a capture orientation mode setting of the capture device. For example, the capture orientation mode may be portrait mode or landscape mode.

The method 700 includes capturing (704) a video using one of a first camera or a second camera based on the capture orientation mode and a current orientation of the capture device, Here, the video may be captured in the capture orientation mode. As described with respect to FIGS. 1-4, the current orientation of the capture device may be portrait orientation or landscape orientation.

The method 700 includes storing (706), after capturing, the video in a video file.

In some embodiments, in case that the capture orientation mode is the landscape mode and the current orientation is the landscape orientation, then the capturing is performed using the second camera.

In some embodiments, in case that the capture orientation mode is the landscape mode and the current orientation is the portrait, then the capturing is performed using the first camera.

In some embodiments, in case that the capture orientation mode is the portrait mode and the current orientation is the landscape orientation, then the capturing is performed using the first camera.

In some embodiments, in case that the capture orientation mode is the portrait mode and the current orientation is the portrait orientation, then the capturing is performed using the second camera.

The method may further include receiving, on a user interface of the capture device, an input to change the capture orientation mode; and changing the capture orientation mode based on the input without changing the current orientation of the capture device.

In some embodiments, the video comprises a first portion captured using the first camera and a second portion captured using the second camera, and wherein the storing the video file comprises: processing the video file by chronologically combining the first portion and the second portion.

In some embodiments, the current orientation of the capture device is continuously monitored during the capturing.

Figure 8:
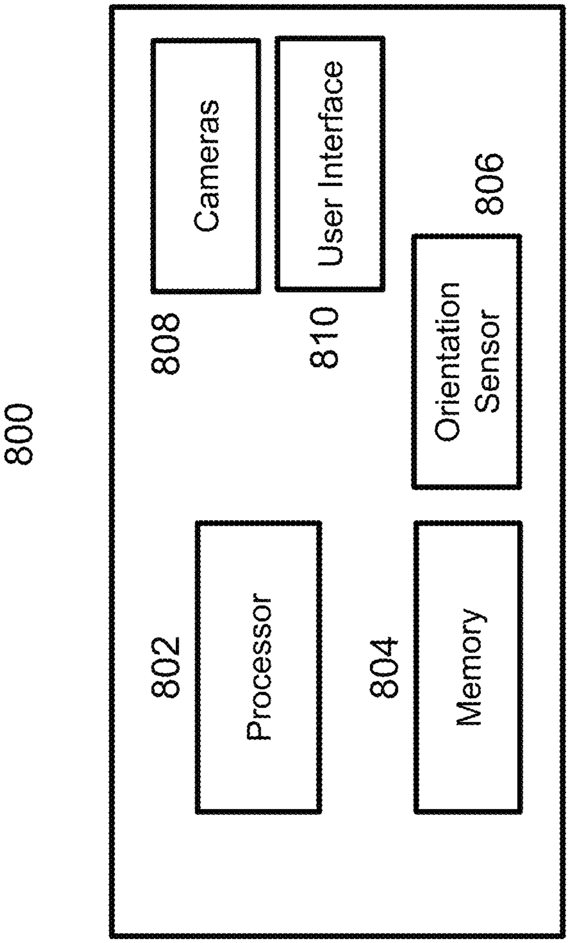
FIG. 8 is a block diagram of a video capture device.

FIG. 8 shows an example video capture device 800. The device 800 includes a first camera configured to capture a landscape mode video and a second camera configured to capture a portrait mode video (reference numeral 808). The device 800 includes an orientation sensor 806 configured to detect a current orientation of the video capture device. The device 800 includes a user interface 810. The device 800 includes a processor 802 configured to: receive a capture orientation mode setting; control a video capture session using one of a first camera or a second camera based on the capture orientation mode and the current orientation of the capture device; and store the video into a memory associated with the video capture device.

In some embodiments, the capture orientation mode is one of a portrait mode or a landscape mode.

In some embodiments, the current orientation of the video capture device is one of a portrait orientation or a landscape orientation.

In some embodiments, in case that the capture orientation mode is the landscape mode and the current orientation is the landscape orientation, then the capturing is performed using the second camera.

In some embodiments, in case that the capture orientation mode is the landscape mode and the current orientation is the portrait, then the capturing is performed using the first camera.

In some embodiments, in case that the capture orientation mode is the portrait mode and the current orientation is the landscape orientation, then the capturing is performed using the first camera.

In some embodiments, in case that the capture orientation mode is the portrait mode and the current orientation is the portrait orientation, then the capturing is performed using the second camera.

In some embodiments, the processor is further configured to: receive, on the user interface, an input to change the capture orientation mode; and change the capture orientation mode based on the input without changing the current orientation of the capture device.

In some embodiments, the video comprises a first portion captured using the first camera and a second portion captured using the second camera, and wherein the storing the video file comprises: processing, by the processor, the video file by chronologically combining the first portion and the second portion. The video file may be stored in a memory 804 of the device 800. The memory 804 may also be used for storing program instructions, metadata and other useful information for the operation of the device 800.

In some embodiments, the current orientation of the video capture device is continuously monitored during the capturing.

In some embodiments, the video capture device is a mobile phone.

In some embodiments, the video capture device is a tablet.

In some embodiments, method 700 may operate to allow a user of the electronic device to seamlessly change the capture orientation mode to be same as the current orientation of the capture device. This may be achieved by having the user make a selection on the user interface to stay with the current orientation mode. Such a setting may be used, for example, when a user is capturing video in landscape mode and then notices something of interest up above and wants to capture the vertical detail by simply tilting the electronic device from landscape orientation to portrait orientation. In such a case, a marker may be introduced in the captured video such that the video file that is generated from the capture may include video portions that are in different orientations in the same chronological order as the user's tilting of the electronic device. In some embodiments, the processor may generate metadata information associated with captured video, e.g., each frame of video, by writing the device orientation and the capture mode of the device when the frame was captured. This metadata information may be used in splicing together captured video files to have the correct intended orientation for playback.

The foregoing description also applies to the user facing cameras. The user can hold the cellphone in portrait mode, and takes self-photo (selfie) or self-video in landscape or portrait mode via onscreen icon selection (Ref. FIG. 4) without having to rotate the cellphone.

In some embodiments, while capturing is in progress, orientation of the video capture device is then transitioned from portrait to landscape and vice versa. For example, if the video capture device is tilted 10 degrees or more, for example, the processor, receiving data from the accelerometer, tags each tilted video frame, and provides the user with an option of keeping or deleting the tagged video frames.

In some embodiments, the threshold for the accelerometer to change from portrait to landscape mode and vice versa is about 45 degrees (e.g., 45 degrees plus-minus one degree for tolerances due to practical hardware implementations).

Embodiments may use one of two types of accelerometer, analog or digital. The analog type outputs a continuous voltage that is proportional to acceleration. While a digital accelerometer may use pulse width modulation (PWM) for its output, which means there is a square wave of a certain frequency, and the amount of time the voltage is high will be proportional to the amount of acceleration or tilt angle. The processor of the video capture device can measure the time of logic high to determine the angle and tag each video frame as the cellphone is tilted toward a mode change.

For continuous rotation while in capture mode, the processor can notify the user via on screen message "capturing in progress, ready to switch camera" to make the user aware of the eventual output video that may adversely affect the viewing experience.

In some embodiments, 3D capturing and viewing on cellphone screen without using 3D viewing glass (glass-less 3D) may be performed. For 3D capture, there may be 4 forward-facing cameras. Two mounted on the top left corner, and two mounted on the top right corner to emulate the binocular vision that yields a perception of depth. Top left and top right camera sensors may be in landscape orientation. Below top left and below top right camera sensors are in portrait orientation. The resultant captured video will have 2 video capture files. One from cameras 1L and/or 2L, and the other from cameras 1R and/or 2R. The processor will alternately display L and R video, at high frame rate, in synchronization with the active L and R pixel filter that layered on a display screen, under the capacitive touch screen layer. When L video is displayed, L pixel filter is activated, and when R video is displayed, R pixel filter is activated. How wide or narrow the 3D viewing angle depends on the design of the active pixel filter. Therefore, the presently disclosed techniques may also be applied for mode management in 3D video capture.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

It will be appreciated that various embodiments of video capture devices that enable capturing of video in landscape mode are disclosed. Using the disclosed techniques, handheld devices may allow a user to capture and enjoy a live scenery using a video format suitable to capture the viewing experience. The disclosed embodiments may be assisted by a processor-based software that implements certain steps of the disclosed methods.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

The invention claimed is:

1. A method of camera operation, comprising:

capturing, using a capture device comprising user-facing cameras comprising a first camera, a second camera, a third camera and a fourth camera, a 3D video using one of (a) the first camera and the second camera, or (b) the third camera and the fourth camera based on a capture orientation mode and a current orientation of the capture device, wherein:

the capture orientation mode is one of a portrait mode or a landscape mode;

the current orientation of the capture device is one of a portrait orientation or a landscape orientation; and the capture orientation mode is determined based on a capture orientation mode used in a most recent photo session;

when the capture orientation mode is the landscape mode and the current orientation is the landscape orientation, the capturing is performed using (b) the third camera and the fourth camera;

when the capture orientation mode is the landscape mode and the current orientation is the portrait orientation, the capturing is performed using (a) the first camera and the second camera;

when the capture orientation mode is the portrait mode and the current orientation is the landscape orientation, the capturing is performed using (a) the first camera and the second camera; or when the capture orientation mode is the portrait mode and the current orientation is the portrait orientation, the capturing is performed using (b) the third camera and the fourth camera; and storing, after capturing, the 3D video in two video files;

wherein the two video files comprise a left video and a right video.

2. The method of claim 1, further including, displaying the video that is captured in the two video files by alternately displaying the left video and the right video in synchronization with a left active pixel filter and a right active pixel filter, such that when the left video is displayed, the left active pixel filter is activated and when the right video is displayed, the right active pixel filter is activated.

3. The method of claim 2, wherein a 3D viewing angle of the video during display is controlled by the left active pixel filter and the right active pixel filter.

4. A capture device, comprising:

a first camera, a second camera, multiple sensors comprising one or more accelerometers and/or a screen orientation sensor;

a processor; and a non-transitory memory;

wherein the processor is configured to:

determine whether the first camera or the second camera is to be used based on a capture orientation mode and a current orientation of the capture device, wherein:

the capture orientation mode is one of a portrait mode or a landscape mode;

the current orientation of the capture device is one of a portrait orientation or a landscape orientation;

the capture orientation mode is determined based on a capture orientation mode used in a most recent photo session; and the current orientation is determined by the multiple sensors;

when the capture orientation mode is the landscape mode and the current orientation is the landscape orientation, the processor determines that the second camera is to be used;

when the capture orientation mode is the landscape mode and the current orientation is the portrait orientation, the processor determines that the first camera is to be used;

when the capture orientation mode is the portrait mode and the current orientation is the landscape orientation, the processor determines that the first camera is to be used; or when the capture orientation mode is the portrait mode and the current orientation is the portrait orientation, the processor determines that the second camera is to be used;

capture a video using the determined camera; and store the video to the non-transitory memory as a video file;

wherein the video file comprises video clips captured by the first camera and the second camera, wherein the processor is further configured to join the video clips in a chronological order and with a matching upside orientation.

5. The capture device of claim 4, wherein the first camera and the second camera are user-facing cameras configured to operate in a selfie-mode.

6. The capture device of claim 4, wherein the processor is configured to determine a tilt angle of the capture device based on signals from the multiple sensors and tag each frame of the video according to the determined tilt angle.

7. A method of camera operation, comprising:

capturing, using a capture device comprising a first user-facing camera configured for a selfie-mode capture and a second user-facing camera configured for the selfie-mode capture, a video in a selfie-mode using one of the first camera or the second camera based on a capture orientation mode and a current orientation of the capture device; and storing, after capturing, the video in a video file;

wherein the current orientation is determined based on signals from multiple sensors comprising one or more accelerometers or a screen orientation sensor, wherein at least a first sensor is disposed on a long edge of the capture device and a second sensor is disposed on a short edge of the capture device and wherein the current orientation is determined based on a linearly weighted average of signals from the multiple sensors.

8. The method of claim 7, wherein the capture orientation mode is one of a portrait mode or a landscape mode and wherein the current orientation of the capture device is one of a portrait orientation or a landscape orientation.

9. The method of claim 8, wherein:

in case that the capture orientation mode is the landscape mode and the current orientation is the landscape orientation, then the capturing is performed using the second camera, in case that the capture orientation mode is the landscape mode and the current orientation is the portrait orientation, then the capturing is performed using the first camera, in case that the capture orientation mode is the portrait mode and the current orientation is the landscape orientation, then the capturing is performed using the first camera, and in case that the capture orientation mode is the portrait mode and the current orientation is the portrait orientation, then the capturing is performed using the second camera.

10. The method of claim 7, further including:

receiving, on a user interface of the capture device, an input to change the capture orientation mode; and changing the capture orientation mode based on the input without changing the current orientation of the capture device.

11. The method of claim 7, wherein the video comprises a first portion captured using the first camera and a second portion captured using the second camera, and wherein the storing the video file comprises:

processing the video file by chronologically combining the first portion and the second portion.

12. The method of claim 11, wherein the current orientation of the capture device is continuously monitored during the capturing.

* * * * *